March 22, 1966  F. E. PORTER ETAL  3,241,264
SEED-GERMINATION AND PLANT-STARTER PACKET
Filed Dec. 23, 1963  2 Sheets-Sheet 2

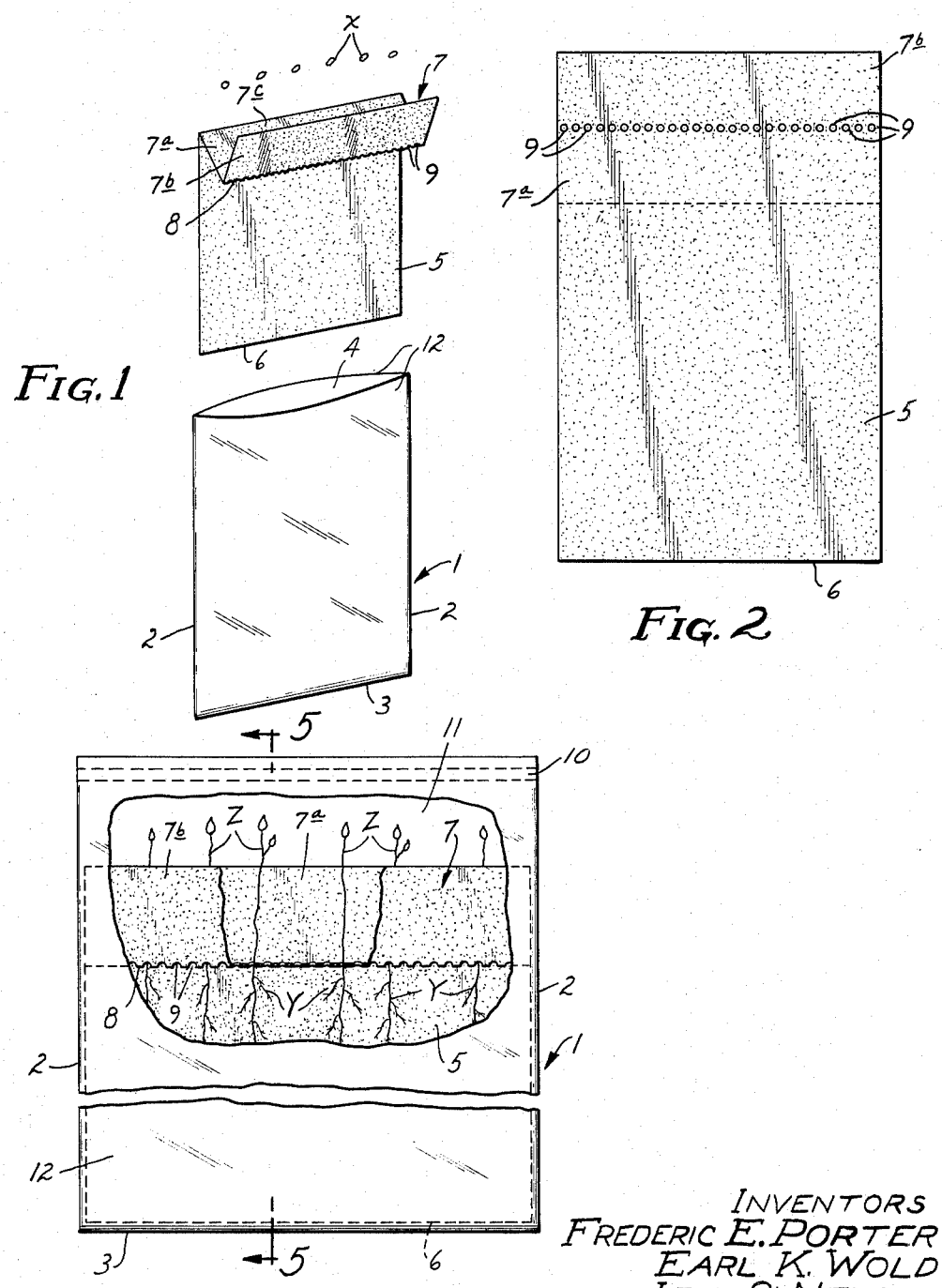

INVENTORS
FREDERIC E. PORTER
EARL K. WOLD
IRA S. NELSON
BY
Merchant, Merchant & Gould
ATTORNEYS

United States Patent Office 3,241,264
Patented Mar. 22, 1966

3,241,264
SEED-GERMINATION AND PLANT-STARTER
PACKET
Frederic E. Porter, Earl K. Wold, and Ira S. Nelson,
Minneapolis, Minn., assignors to Northrup, King &
Co., Minneapolis, Minn., a corporation of Minnesota
Filed Dec. 23, 1963, Ser. No. 332,638
5 Claims. (Cl. 47—38.1)

Our invention relates generally to seed-germination and plant-starter packets or kits, and has for its principal object the provision of a throw-away device which may be produced at an extremely low cost and which may be stored, shipped, and operatively arranged in a minimum of space.

A further object of our invention is the provision of a seed-germination and starter packet which incorporates a waterproof envelope-like container, preferably formed from transparent plastic sheeting or the like, and having therein a seed-carrying moisture absorbing wick, whereby seeds may be shipped and stored in a dry state, for subsequent addition of moisture and/or nutrient by the ultimate consumer.

A further object of our invention is the provision of a device of the class immediately above described wherein the wick is formed at its upper end to define an elongated upwardly opening seed-containing trough, the bottom of which trough is provided with longitudinally closely spaced apertures whereby, upon the addition of moisture to the envelope, the seeds in the trough will germinate with the roots thereof projecting downwardly through the apertures and the stem and foliage projecting upwardly through the open top of the trough.

A still further object of our invention is the provision of a device of the class immediately above described which requires but a minimum of time and skill to remove the several plants from the container and trough, without damage to the roots or stems thereof, when desired.

The above and still further objects of our invention will become apparent from the following detailed specification, appended claims and attached drawings.

Referring to the drawings, wherein like characters indicate like parts throughout the several views:

FIG. 1 is an exploded view in perspective of the components of our novel seed kit or packet;

FIG. 2 is a plan view of a blank of absorbent papyraceous material from which the wick and seed trough of our invention are formed;

FIG. 3 is an enlarged view in elevation of our novel seed packet, illustrating the seeds after germination thereof, some parts being broken away and shown in section;

Figure 4:
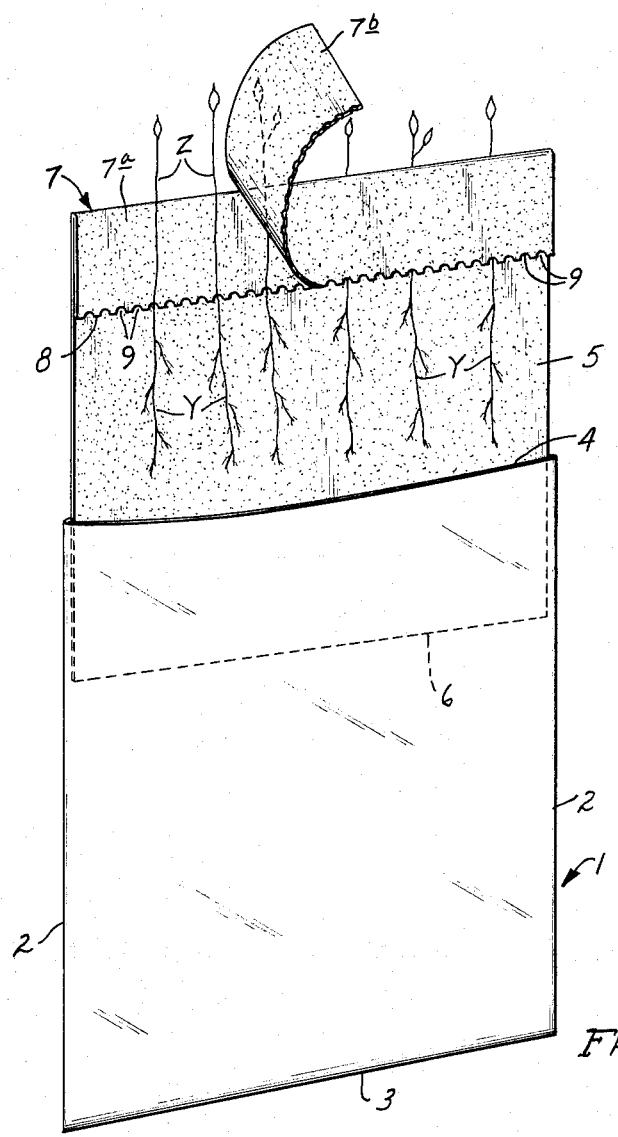
FIG. 4 is a view in perspective of the structure of FIG. 3 illustrating steps essential to the removal of germinated plants.
Figure 5:
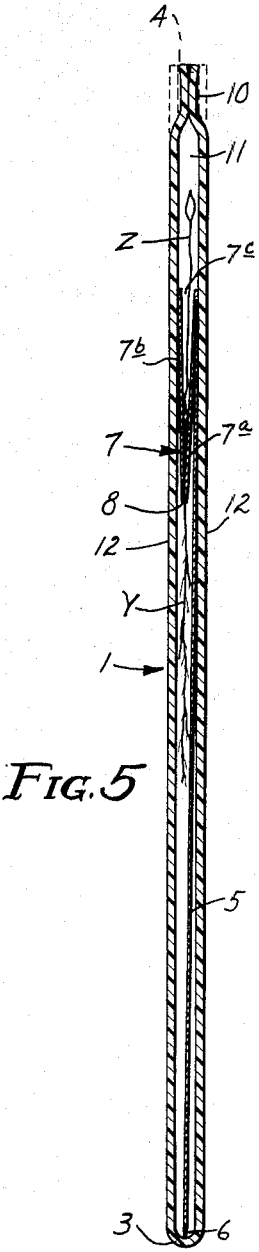
FIG. 5 is an enlarged view in vertical section as seen from the line 5—5 of FIG. 3, some parts being broken away.

Referring with greater particularity to the drawings, the numeral 1 indicates a moisture-impervious envelope-like container, preferably formed from flexible plastic sheet material such as Mylar. Container 1 is sealed along its opposite side edges 2 and its bottom edge 3, whereas the upper edges are unsealed whereby to provide an opening 4.

Adapted to be inserted within the open top 4 of our envelope-like container 1 is an elongated wick 5 preferably formed from suitable absorbent papyraceous material such as paper toweling. Preferably the width of the wick 5 corresponds generally to the longitudinal dimensions of the opening 4, whereas the lower edge 6 thereof is seated against the sealed bottom 3 of the container 1. At its upper end, and in spaced relation to the opening 4 of the container 1, the wick 5 is accordion-folded to define an upwardly opening trough 7 for the reception of one or more seeds X to be germinated. Along its bottom edge 8, the trough 7 is provided with a plurality of closely spaced apertures 9, the function of which will hereinafter become apparent.

Our novel packet, above-described, obviously may be shipped either with or without seeds X within the trough 7. Under circumstances where the seeds X are placed within the trough 7, it may be desirable to seal the opening 4 against moisture. This may be done either by a sealing flap, not shown, or by heat sealing along the upper edge of the container 1 adjacent the opening 4, as indicated by 10 in FIG. 3. In any event, when one desires to initiate germination of seeds X within the trough 7, it is but necessary to introduce moisture, and nutrients where desired, through the open top 4. Such added material will obviously accumulate in the lower portion of the container 1 and will be constantly absorbed by the wick 5 and trough 7, preferably formed integrally therewith. In any event, the wick 5 and trough 7 will be maintained in a flat upright condition due to engagement of the opposite side walls 12 of the container 1 with the adjacent faces of the wick 5 and trough 7.

While light is not essential to the germination of the seeds X, it is essential to the growth of the plant resulting from such germination. Consequently, under conditions where limited growth of the plants is desired (for purposes of subsequent transplanting and the like), the containers 1 should be arranged wherein they are exposed to light, either natural or artificial. As shown in FIG. 3, the roots Y, resulting from germination of the seed X, will project downwardly through the apertures 9 whereas the stems and foliage Z of said seeds X will grow upwardly between the opposite sides 7a, 7b of the trough 7 and out the open upper end 7c thereof to occupy the space 11 immediately below the open top 4.

When it is desired to remove the plants Y, Z from the container 1 and trough 7, the wick element 5 with the trough 7 secured thereto is first removed from the container 1 through the opening 4 thereof, as indicated in FIG. 4. Thereafter the outer wall 7b of the trough 7 will be separated from the wall 7a by tearing along the aperture-forming perforations 9, for purposes of transplanting or the like.

Our invention has been thoroughly tested and found to be completely satisfactory for the accomplishment of the above objects, and while we have shown and described a preferred embodiment, we wish to be specifically understood that the same is capable of modification without departure from the spirit and scope of the appended claims.

What is claimed is:
1. In a device of the class described,
   (a) a moisture-proof upwardly opening envelope-like container, and
   (b) an elongated moisture-absorbing wick element formed from sheet material received within the opening defined by said container and maintained in a generally upright condition within said container by engagement thereof with the walls of said container,
   (c) the upper end of said wick element being folded downwardly and upwardly to define a generally horizontally disposed upwardly opening trough below said opening and facing said opening,
   (d) the bottom of said trough defining longitudinally spaced root-receiving apertures, said wick element and trough being integrally formed from papyraceous sheet material.

2. The structure defined in claim 1 in which the width of said wick element corresponds generally to the longitudinal dimensions of the opening defined by said envelope-like container.

3. In a device of the class described,
   (a) an elongated generally upright wick element having flat sides formed at its upper end portion to define an upwardly opening seed-receiving trough,
   (b) the bottom of said trough defining root-receiving aperture means, and
   (c) means for supporting said wick element in overlying relationship to a body of water with the lower end of said wick element immersed therein, said last mentioned means comprises a fluid-tight envelope-like container in which said wick element is fully received, the opposite walls of said container engaging opposite flat sides of said wick.

4. The structure defined in claim 3 in which said container is formed from transparent flexible plastic sheet material.

5. The structure defined in claim 4 in which said container in upwardly spaced relation to said trough is provided with an access opening.

References Cited by the Examiner
UNITED STATES PATENTS

| 1,172,787 | 2/1916 | Gray | 47—14 |
| 2,026,322 | 12/1935 | Rainey | 47—1.2 |
| 2,431,063 | 11/1947 | McGahey. | |
| 2,739,422 | 12/1954 | Perkins. | |
| 3,177,616 | 4/1965 | Sawyer | 47—37 X |

OTHER REFERENCES

Publication—Taloumis, George "Gardening with Plastics." In Horticulture, vol. XXI, No. 9, pp. 376. September 1953.

ABRAHAM G. STONE, *Primary Examiner.*

ANTONIO F. GUIDA, *Examiner.*

J. R. OAKS, *Assistant Examiner.*